United States Patent [19]
Gifford

[11] 3,719,322
[45] March 6, 1973

[54] THERMALLY RESPONSIVE VALVE ASSEMBLY
[75] Inventor: Robert T. Gifford, Yellow Springs, Ohio
[73] Assignee: Vernay Laboratories, Inc., Yellow Springs, Ohio
[22] Filed: April 8, 1971
[21] Appl. No.: 132,494

[52] U.S. Cl. .................................................. 236/102
[51] Int. Cl. ............................................. G05d 23/02
[58] Field of Search .......... 236/93, 102, 87; 137/468; 60/23

[56] References Cited
UNITED STATES PATENTS

| 2,820,473 | 1/1958 | Reiners | 236/93 X |
| 2,872,120 | 2/1959 | Weiland | 236/102 X |
| 2,966,170 | 12/1960 | Raulins | 236/93 X |
| 3,294,148 | 12/1966 | Alvarado | 236/93 X |
| 3,322,345 | 5/1967 | Getz | 236/93 |
| 3,128,043 | 4/1964 | Feinberg | 236/93 A |

Primary Examiner—William E. Wayner
Attorney—Marechal, Biebel, French & Bugg

[57] ABSTRACT

A thermally responsive valve assembly includes a cylindrical casing or shell in which is mounted a rod-like valve core which is attached to the casing or shell at one end and extends outwardly of the shell at its opposite end. The valve core is formed of a material having an appreciable different coefficient of linear thermal expansion than the material of which the outer casing or shell is formed and the external diameter of the valve core is sufficiently smaller than the internal diameter of the casing or shell to allow the core and shell to move axially with respect to each other in response to changes in temperature. The external surface of the shell is threaded so that the complete valve assembly may be threaded into position with the outwardly extending portion of the valve core located within a port through which the fluid flow is to be regulated. The initial setting of the valve core with respect to the port is adjusted by threading the shell into the wall of the member in which the port is formed, and thereafter, changes in temperature will cause the effective area of the port to be varied as either the valve member or the casing expands and contracts in response to temperature changes.

9 Claims, 2 Drawing Figures

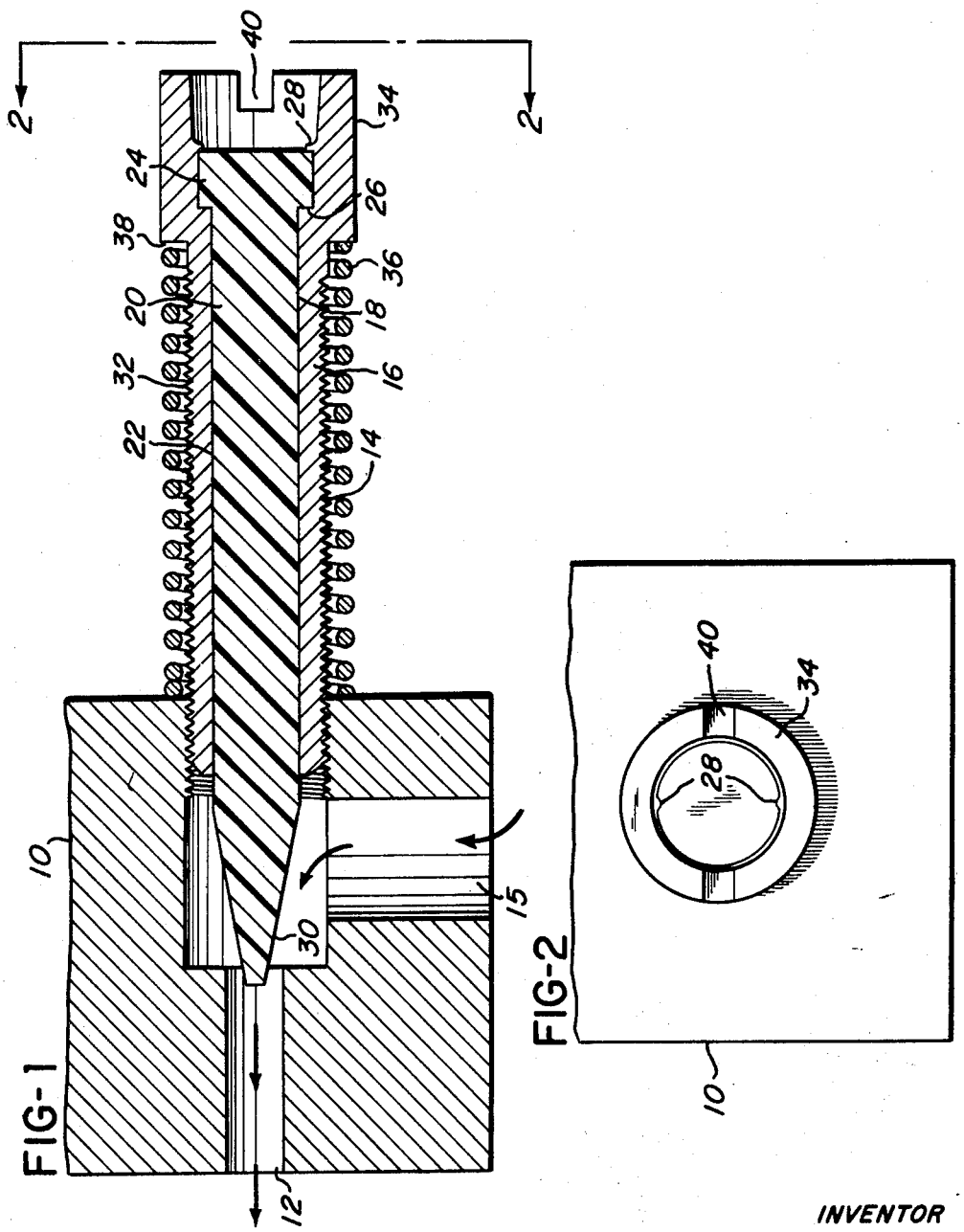

THERMALLY RESPONSIVE VALVE ASSEMBLY

CROSS REFERENCE TO RELATED APPLICATION

VALVE RESPONSIVE TO TEMPERATURE CHANGES OVER A LIMITED RANGE, by Robert T. Gifford, Ser. No. 132,666 filed on an even date herewith (Docket 5412)

BACKGROUND OF THE INVENTION

It is often desirable to regulate the flow of a fluid through a port in response to changes in temperature. For example, the U.S. Pat. to Lockwood, No. 3,340,893, discloses a throttle to provide a constant resistance to flow in a hydraulic system despite changes in the temperature of the hydraulic fluid flowing through the hydraulic system. Similarly, the U.S. Pats. to Boekelman, Jr. and Sr., Nos. 3,540,650 and 3,559,885, disclose mixing devices in which the proportions of hot and cold fluids are varied to maintain the mixed fluid at some preselected temperature.

In controlling the flow of air, fuel or an air-fuel mixture into a carburetor during idling it is also desirable that the amount of open area through the inlet port be varied in response to temperature changes. While each of the above noted patents is designed to accomplish regulation of fluid flow in response to temperature changes, it will be noted that each of these flow regulating devices are formed of several interconnected parts which, of course, necessarily increase the cost of each of such regulating devices as well as increasing the number of potential sources of malfunction. In the manufacture of relatively high volume products, such as carburetors, it is desirable to have a regulating member which is as inexpensive as possible, yet durable and accurate.

SUMMARY OF THE INVENTION

The present invention provides a valve member which is responsive to changes in temperature to regulate the effective cross-sectional area of a port to control fluid flow therethrough. The valve member consists of only two parts and hence, is very inexpensive to manufacture and relatively rugged and maintenance-free. This is accomplished by forming a valve core member and attaching it adjacent one of its ends to a valve casing or shell member with the opposite end protruding from the shell. The casing or shell is then attached to the unit with which it is to be associated with the outwardly protruding end of the valve core positioned within the fluid port through which fluid flow is to be regulated. The materials of which the core and the casing or shell are formed have coefficients of linear thermal expansion which differ greatly from each other. Therefore, changes in temperature will cause either the valve core or the casing to expand, advancing or retracting the protruding end of the core into or out of the port, and varying the effective open area of the port. Since the lengths of the core and shell are much greater than their diameters, expansion and contraction will be principally in the longitudinal direction. The present invention, therefore, provides a compact, relatively simple, and inexpensive valve assembly which nonetheless, provides accurate control over fluid flow through a port in response to temperature changes.

BRIEF DESCRIPTION OF THE DRAWINGS

FIG. 1 is a cross-sectional view showing the valve assembly installed in a typical installation; and
FIG. 2 is a view taken on line 2—2 of FIG. 1

DESCRIPTION OF THE PREFERRED EMBODIMENTS

A portion 10 of a wall of, for example, a carburetor, may be provided with a port 12 therethrough having an enlarged threaded portion 14 and an inlet 15 intersecting the port. Received in the threaded portion 14 of the member 10 is a substantially cylindrical valve casing or shell member 16 having an internal bore 18 extending axially thereof. An elongated, unitary, rod-like valve core member 20 is received in the bore of the valve shell, and is provided with a shank portion 22 of sufficiently smaller diameter than the internal diameter of the bore 18 to permit free movement of the shank portion 22 within the bore 18. One end 24 of the valve core 22 is enlarged to provide a shoulder 26 which abuts against an opposing shoulder of the casing 16 and is fixed in this position in any convenient manner, such as by deforming a portion of the casing into contact with the outer surface of the enlarged portion 24, as at 28. The opposite end 30 of the valve core 20 is conically shaped and protrudes outwardly of the valve shell and into the flow port 12.

The outer surface of at least a portion of the shell 16 is provided with external threads 32 which are complementary to the threads 14 to permit the casing or shell of the valve member to be threaded into the member 10. The casing or shell 16 is also provided with an enlarged portion 34 and a coil spring 36 surrounds the shank of the casing 16 and bears at one end against the member 10 and at the opposite end against the shoulder 38 formed by the enlarged portion 34. It will also be noted from FIGS. 1 and 2 that the enlarged portion of the casing 16 is provided with a tool engageable portion such as a slot 40.

The valve assembly, consisting of the valve casing or shell member 16 and the valve core member 20, will usually be assembled at one point and shipped as a unit to another point for attachment to the member 10. To attach the valve assembly the casing 16 is threaded into the member 10 until the desired clearance between the conically shaped outwardly protruding portion 30 of the valve core 20 is positioned within the port 12 the amount necessary to give the desired flow area through the port 12 at the then prevailing ambient temperature. The spring 36, bearing against the shoulder 38 and the wall of the member 10, serves to maintain the casing 16 and the core 20 in this preset position.

Fluid will flow, for example, in the direction indicated by the arrows through the inlet 15 and port 12 when the unit with which the valve assembly is associated is in operation, although it will be appreciated that the flow direction could be reversed. The valve core member 20 is formed of a material having a coefficient of linear thermal expansion appreciably different than the coefficient of linear thermal expansion of the valve casing member 16. Thus, as the temperature increases the core 20 and the casing 16 will expand appreciably different amounts and, since the core 20 is fixed at one end to the casing 16, its conically shaped opposite end will move with respect to the port 12. For example, if the coefficient of linear thermal expansion of the core is relatively high as compared to the shell, the core will expand and move towards the left as seen in FIG. 1 of the drawings, thereby decreasing the effective open area of the port 12. On the other hand, if the coefficient of linear thermal expansion of the shell 16 is relatively high with respect to the core, the shell will expand and move the conically shaped end 30 towards the right as seen in FIG. 1.

As noted above, the shank 22 of the core 20 is made of sufficiently smaller cross sectional area than the internal bore 18 of the casing 16 to permit relatively free movement between the unattached shank portion and the surrounding bore 18. Of course, upon a decrease in temperature the core 20 and the casing 16 will contract appreciably different amounts, moving the conically shaped opposite end of the core oppositely to the directions described above.

As noted above, the coefficient of linear thermal expansion of the valve core member 20 is made sufficiently different from that of the valve casing or shell member 16 to provide the necessary response to temperature changes. To accomplish this the coefficient of linear thermal expansion of one of the members 20 and 16 should be at least 3 times greater than the other. Utilizing combinations of readily available materials this difference will be in the range of approximately three to twenty five.

A variety of materials may be used to give the desired degree of expansion upon changes in temperature and relatively rigid, organic polymers, both thermosetting and thermoplastic, such as polyvinylidene fluoride, polyethylene, acrylics, acetal resins and nylon have the desired characteristics necessary for the practice of the present invention. Thus, either the valve casing or the core may be formed of one of the above materials and the other member formed of a material such as steel having a coefficient of linear thermal expansion of approximately $6 \times 10^{-6}$ inch/inch/°F., although a 20-4-percent glass filled nylon will also function satisfactorily. Thus, forming one of the members, either the shell or the core, of steel and the remaining member of polyvinylidene fluoride, the coefficient of linear thermal expansion of the member formed of polyvinylident fluoride will be approximately 13 times that of the member formed of steel.

Regardless of the specific materials utilized, although of course, the materials selected must be compatible with the temperatures and fluids expected to be encountered, it will be seen that the present invention provides a thermally responsive valve assembly in which either the valve core member itself or the valve casing or shell member also serves as the actuating mechanism and in which the construction is extremely simple, limited to two parts, thereby providing an inexpensive, compact and maintenance-free construction.

While the forms of apparatus herein described constitute preferred embodiments of the invention, it is to be understood that the invention is not limited to these precise forms of apparatus, and that changes may be made therein without departing from the scope of the invention.

What is claimed is:

1. A thermally responsive valve assembly comprising:

a. a wall member having means defining a flow port therethrough,
b. an inner end of said flow part being of substantially reduced diameter,
c. an outer end of said flow port being of substantially larger diameter than said inner end thereof,
d. means defining internal threads in said flow port at said outer end thereof,
e. means defining an inlet extending into said wall member and intersecting said flow port intermediate said inner and outer ends thereof,
f. a valve member consisting essentially of two elements,
g. a first of said two elements consisting of an elongated, cylindrical, thin walled valve shell,
h. means defining an unthreaded, substantially smooth surfaced, constant diameter bore extending axially through said shell,
i. an outer end of said bore through said shell being substantially larger than the remainder of said bore and defining a shoulder at the intersection of said outer end and said remainder of said bore,
j. means defining external threads on the outer surface of said shell complementary to and in engagement with said internal threads,
k. the second of said two elements consisting of an elongated unitary, rod-like valve core of relatively rigid polymeric material having a coefficient of linear thermal expansion substantially greater than said shell,
l. said core including a central shank portion, an enlarged outer end and a conically shaped inner end,
m. the intersection of said shank portion and said enlarged portion of said core defining a shoulder received in overlying relation to said shoulder on said shell,
n. means fixing said shoulders in said overlying relationship with said enlarged portion of said core permanently fixed in said outer end of said shell against movement relative thereto,
o. said shank portion of said core having a substantially smooth surfaced, unthreaded, outer periphery of substantially constant diameter slidably received in said bore of said core, and
p. said conically shaped inner end of said core having at least a portion thereof received within said reduced diameter inner end of said flow port through said wall member,
q. whereby thermally induced axial movement of said core within said shell inwardly of said overlying shoulders thereof will cause said conically shaped inner end of said core to move within said reduced diameter inner end of said flow port to vary the effective diameter thereof in response to temperature variations.

2. The assembly of claim 1 wherein:
a. said material comprises polyvinylidene fluoride.
3. The assembly of claim 1 wherein:
a. said material comprises polyethylene.
4. The assembly of claim 1 wherein:
a. said material comprises nylon.
5. The assembly of claim 1 wherein:
a. said material comprises an acrylic compound.
6. The assembly of claim 1 wherein:
a. said material comprises an acetal resin.
7. The assembly of claim 1 wherein:
a. said material comprises steel.

8. The assembly of claim 1 wherein:
a. the coefficient of linear thermal expansion of said core is at least three times greater than the coefficient of linear thermal expansion of said shell.
9. The assembly of claim 1 wherein:
a. the coefficient of linear thermal expansion of said core is approximately thirteen times greater than the coefficient of linear thermal expansion of said shell.

* * * * *